Sept. 12, 1950
J. A. LYNE
2,521,859
OIL EMULSION TREATER
Filed Jan. 11, 1945
2 Sheets-Sheet 1
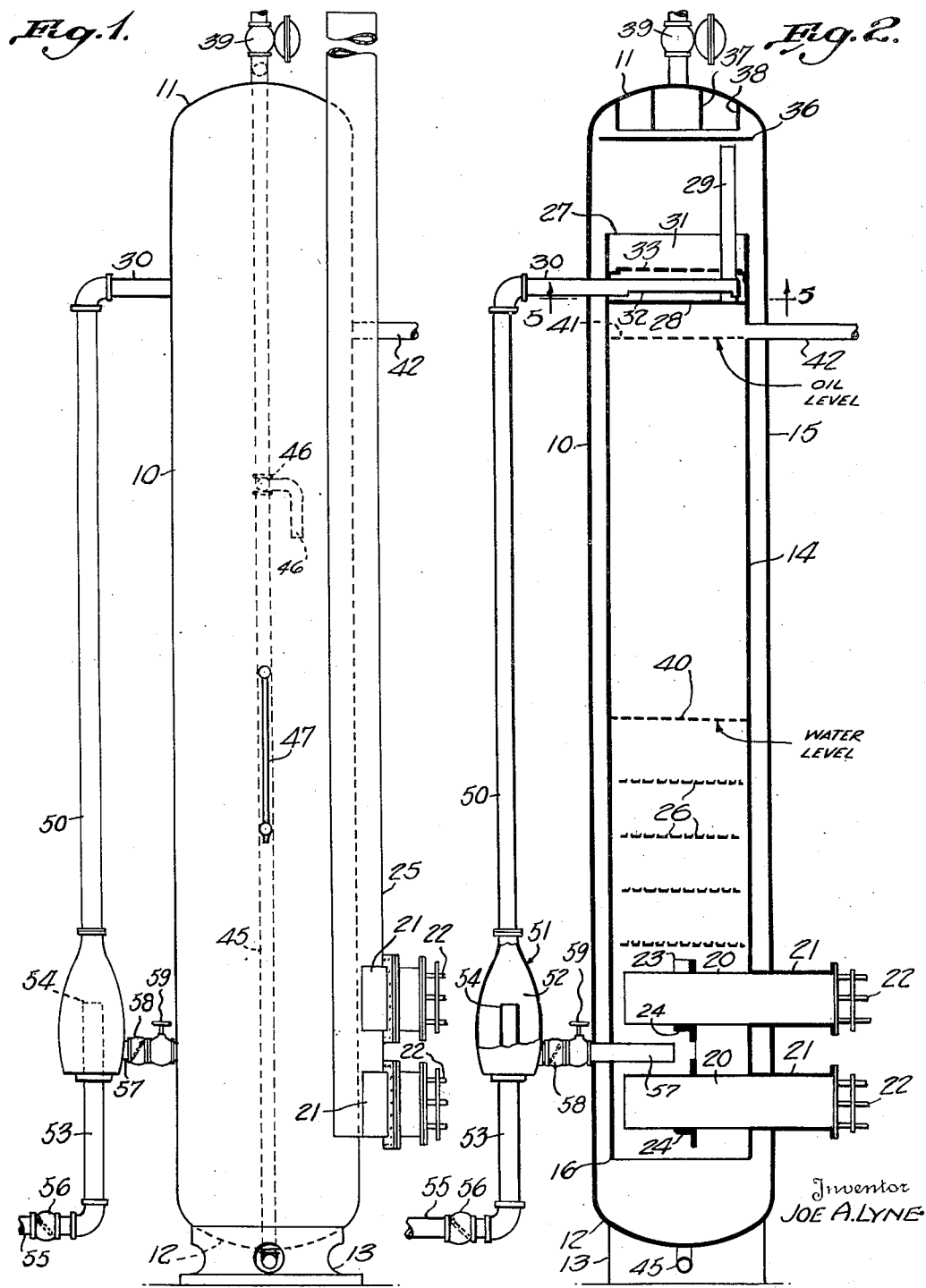
Inventor
JOE A. LYNE

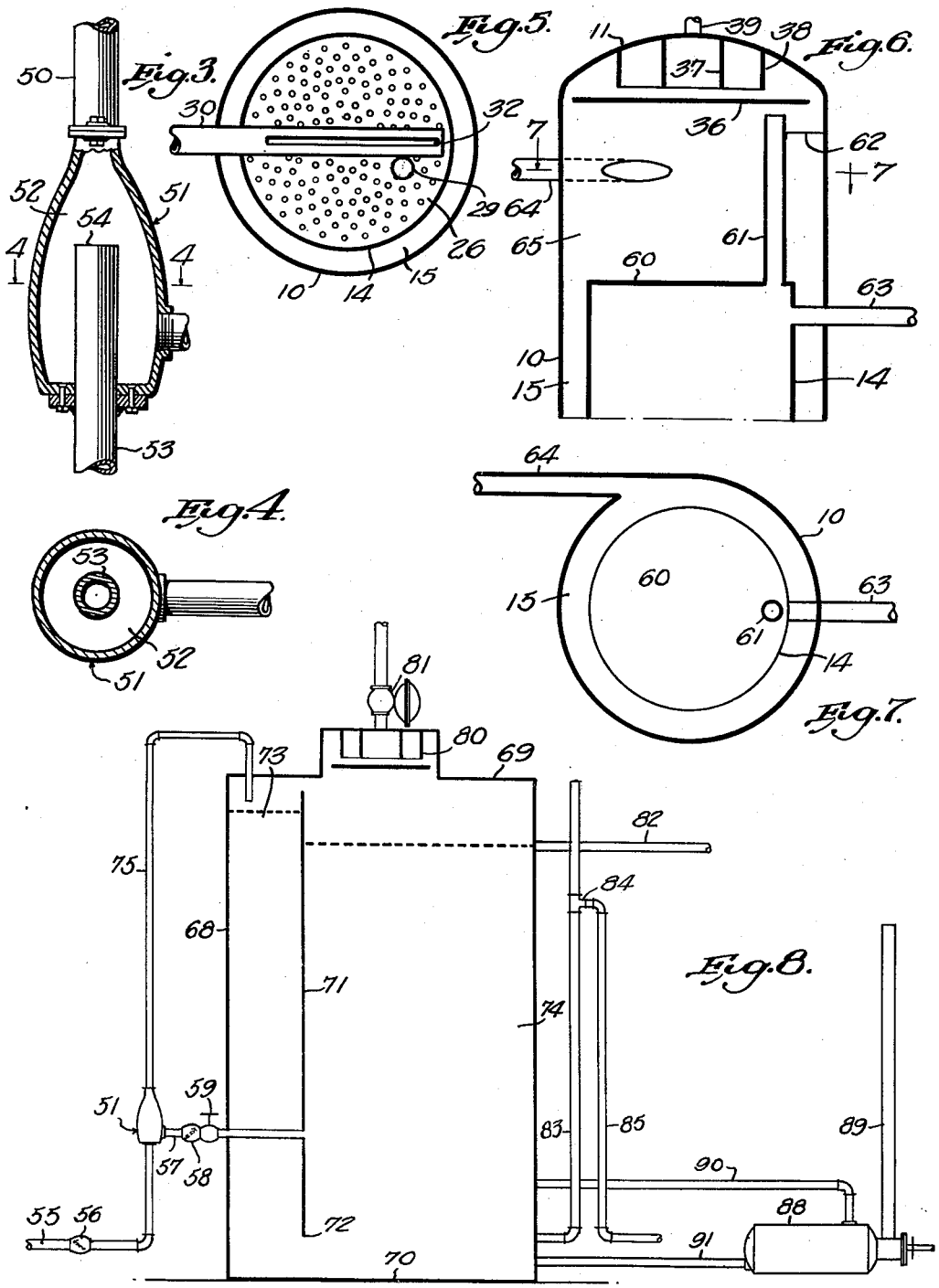

Patented Sept. 12, 1950

2,521,859

UNITED STATES PATENT OFFICE 2,521,859

OIL EMULSION TREATER

Joe A. Lyne, Houston, Tex., assignor to The Parkersburg Rig & Reel Company, Parkersburg, W. Va., a corporation of West Virginia Application January 11, 1945, Serial No. 572,331

10 Claims. (Cl. 183—2.7)

This invention relates to a method and apparatus for treating oil emulsions.

It is the common practice to break oil emulsions and remove gas from oil well fluids by passing such fluids through an emulsion treater wherein oil and water separation takes place assisted by the action of heat, and wherein gas is separated from the fluids and recovered.

A particularly efficient type of such an apparatus is disclosed in the copending application of George E. Dake and Joe A. Lyne, Serial No. 531,106, filed April 14, 1944, now Patent No. 2,449,738. Such an apparatus is being quite widely and satisfactorily used, but difficulty has been encountered with apparatus of this character in the oil fields where the oil contains a substantial proportion of gas. Where such oil is encountered, the rapid escape of gas as the oil well fluids enter the apparatus is such as to create a substantial "boiling" or foaming action similar to effervescence, thus resulting in the carrying over into the gas recovery pipe of other fluid constituents including oil and water. The solution of the problems involved in treating emulsions of this character has proved particularly serious and difficult.

An important object of the invention is to provide a novel method of treating oil well fluids to facilitate the subsequent separation of the constituents of the fluid.

More specifically, a further object is to provide a method of treating oil well fluids prior to passing such fluids through a separator, to substantially preheat the fluids and provide them with an excess of water to more readily free gases from the fluids and to provide the latter with a substantially increased degree of separability.

A further object is to provide a novel emulsion treating apparatus wherein well fluids having a high gas content can be very efficiently handled, the gas being effectively separated and recovered without carrying over appreciable amounts of liquids.

A further object is to provide a novel apparatus of this character wherein initial gas separation is effected prior to the feeding of the oil well fluids into the main apparatus, thus facilitating the initial taking off in the latter apparatus of the greater proportion of the gases and preventing the foaming of the gas-containing fluids, thus eliminating the difficulties which have been encountered in the treating of emulsions of such character.

A further object is to provide such an apparatus wherein a greater volume of emulsions may be treated within a given period of time without necessitating an increase in the size of the treater.

A further object is to provide an apparatus which greatly facilitates the treating of large volumes of tight emulsions without the addition of chemicals, or with a reduction in the amount of chemicals required.

A further object is to provide a novel apparatus of the character referred to wherein the well fluids are not only preheated but are subjected to the action of heated water, and particularly brine, before passing into the main treater apparatus, thus resulting in the releasing of the majority of the gas in the initial heating step.

A further object is to provide an apparatus of this character having novel means for feeding heated water, and particularly brine, from the main separating apparatus into the well fluid line to perform an initial emulsion treating step wherein separation of the oil and water not only is facilitated, but wherein most of the gas is initially freed from the well fluids to flow through the gas outlet duct without carrying over appreciable amounts of liquid.

Other objects and advantages of the invention will become apparent during the course of the following description.

In the drawings I have shown several forms of apparatus, particularly adapted for practicing the invention. In this showing:

Figure 1 is a side elevation of the apparatus,

Figure 2 is a central vertical sectional view through the same looking in the same direction as Figure 1, parts being shown in elevation, Figure 3 is an enlarged sectional view of the mixing and preheating device, parts being broken away and parts being shown in elevation, Figure 4 is a transverse sectional view on line 4—4 of Figure 3, Figure 5 is a sectional view on line 5—5 of Figure 2, Figure 6 is a fragmentary vertical sectional view showing a somewhat modified form of the apparatus, Figure 7 is a transverse sectional view on line 7—7 of Figure 6, and, Figure 8 is a vertical sectional view through a further modified form of apparatus, parts being shown in elevation.

It is well known that oil emulsions containing a small percentage of water are difficult to break and separate, while those containing a substantial proportion of water are more easily separable. I have found that if, prior to the introduction of the well fluids into a treating apparatus for separating the fluids a substantial amount of hot inert liquid, such as water, and particularly brine, is progressively added to the oil well fluids, highly improved results are obtained. In the first place, particularly where well fluids contain so much gas as to cause substantial foaming in the treating apparatus, the addition of hot water frees the gas much more readily, thus preventing foaming in the separating apparatus and the carrying off of liquids in the form of foam with the gas. In the second place, the known advantage of preheating the well fluids to facilitate the breaking of the emulsions is greatly enhanced by effecting the preheating action by the addition of hot water since, by this step, an excess of water is provided in the well fluids, thus rendering the emulsions much more readily breakable.

Referring to the drawings, wherein several forms of apparatus particularly adapted for the practice of the invention have been illustrated, the numeral 10 designates a vertical cylindrical shell provided with preferably welded upper and lower heads 11 and 12, the latter of which is secured to a suitable relatively heavy support 13. A cylinder 14 is arranged within the shell 10 concentric therewith as shown in Figures 2 and 5. The cylinder 14 is of smaller diameter than the shell 10 to provide an annular space 15 for a purpose to be described. This space communicates with the open lower end of the cylinder 14, the lower extremity 16 of the latter terminating a substantial distance above the bottom of the shell 10.

Heating units 20 extend diametrically into the apparatus near the lower end thereof, these units being mounted in tubes 21 welded to the shell 10 and cylinder 14 to form leak-proof joints. These heating units may be gas-filled, in which case they will be provided with suitable supply pipes 22. Supporting means 23 are provided for the heating units within the cylinder 14, including transverse structural elements 24 on which the respective heating units are directly supported. Where gas-fired heating units are employed, the products of combustion may be carried off through a suitable stack 25. The heating units may be of the type shown in the prior patent to George E. Dake, No. 2,387,883, granted October 30, 1945, from which the disposition of the products of combustion from the heating units will be clearly apparent. The supporting device 23 may be welded to and carried by the cylinder 14. It will be apparent that fluids passing downwardly in the space 15 and passing upwardly into the lower end of the cylinder 14 will be heated by the units 20 and then continue upwardly through and around a series of spaced baffles 26. It also will become apparent that the incoming well fluids are mixtures of oil, gas and water, and emulsions of oil and water, and fluids passing upwardly into the cylinder 14 will have been largely separated as they pass beyond the units 20, and accordingly the latter are immersed in and transfer heat to liquid which is made up very largely of water, and usually salt water.

The upper end 27 of the cylinder 14 is open as shown in Figure 2, and substantially below such end, the cylinder is provided with a horizontal metal partition 28 to which is connected an upstanding pipe 29 for the escape of gas upwardly from the holes beneath the partition 28. Just above the partition 28 is arranged an inlet duct 30 for the fell fluids, this pipe being welded to the shell 10 and cylinder 14 to provide leak-proof joints and having the portion thereof within the chamber 31 above the partition 28 provided with a slot 32 (Figure 5) preferably opening downwardly toward the partition 28. Above the pipe 30, a perforated disk 33 is welded or otherwise secured to the cylinder 14 and is preferably coextensive with the inside thereof. Gases rising free from the liquid constituents of the well fluids, come into contact with a baffle 36 arranged in the upper end of the shell 10 and spaced at its edge therefrom. Most of the liquids carried upwardly with the gas will gather on the surfaces of the plate or baffle 36 to be returned by gravity to the lower part of the apparatus. Above the baffle 36, inner and outer concentric cylindrical members 37 and 38 are secured at their upper edges to the head 11 for the passage thereover of gas which passes the baffle 36 for the collection of any liquids which may remain in the gas. Such gas passes upwardly through an outlet 39 to be collected in the usual manner.

The normal water level in the cylinder 14 is indicated by the numeral 40, while the normal level of the oil separated from the fluids and floating on the body of water is indicated by the numeral 41. This oil, as it accumulates, is adapted to flow outwardly through a discharge pipe 42. To maintain a proper balance of fluids in the cylinder 14, means is provided for preventing the water from rising above the level 40. Such means forms per se no part of the present invention and may be identical with the means shown in copending application Serial No. 531,106, referred to above. Generally, such means comprises a pipe 45 connected between the bottom of the shell 10 and the gas outlet 39 to equalize pressures in such pipe, and the latter is tapped at as 46 for the outward flow of water through pipe 46'. Inasmuch as the specific gravity of the oil above the level 40 is substantially less than that of water, the connection 46 will lie above the water level 40 and will prevent the accumulation of water in the cylinder 14 above such level. In other words, the level of the take-off connection 46, which is really an overflow, is determined in accordance with the weight of a normal column of liquid in the apparatus with the water level at the point 40 and the oil level at the point 41. The oil between the levels 40 and 41 being lighter than water, and all of the fluids in the pipe 45 being water, the level of the connection 46 will lie at such point below the level 41 that the columns of liquid in the inner cylinder 14 up to the level 41 and the water in the pipe 45 up to the connection 46 will balance. The liquid level 41 will not rise due to the presence of the overflow pipe 42, but if the water level 40 tends to rise, the weight of the column in the cylinder 14 becomes greater than the weight of the column in the pipe 45, thus forcing water upwardly through this pipe and through the connection 46, to be carried away through the overflow pipe 46'. If desired, the apparatus may be provided with a conventional water level indicator 47.

Strictly speaking, the conduit 30 is not a mere inlet for well fluids, but for a mixture of such fluids and excess heated water in accordance with the present invention. Such conduit is connected to a downwardly extending pipe 50 (Figures 1, 2 and 3) the lower end of which is secured to the upper end of a mixing and preheating device indicated as a whole by the numeral 51. Such device comprises an elongated bell-like body 52 into which a well fluid inlet pipe 53 extends axially, the upper end 54 of such pipe terminating a substantial distance above the bottom of the chamber 52. The chamber 52 and pipe 53 are generally in the nature of an injector, but the device functions only to a limited extent as such, as will become apparent. The pipe 53 is connected to the source of well fluids by a pipe 55 in which is arranged a check valve 56. The chamber 52 is supplied with water from the interior of the cylinder 15 through a pipe 57 extending through and welded to the shell 10 and cylinder 14. This pipe is provided with a check valve 58 to prevent the back surging of liquids into the cylinder 14. The pipe 57 is also provided with a flow control valve 59. It will become apparent that heated water, usually brine flows into the chamber 52 through the pipe 57 to mix with the well fluids and both to preheat them and to perform the initial separating step.

A somewhat modified type of main separator is shown in Figure 6. In such form of the invention, the shell 10 may be identical with the form of such structure previously described. However, the cylinder 14 will terminate in an upper horizontal head 60, thus eliminating the separating chamber 31. A pipe 61, which may be braced in the shell 10, as at 62, will communicate at its lower end with the interior of the cylinder 14 for the escape of free gas accumulating therein. The oil outlet 63 may be identical with the oil outlet 42 previously described. The mixed well fluid and water may be fed into the separator through a pipe 64 extending tangentially through the shell 10, as clearly shown in Figure 7, whereby the incoming fluids are given a swirling motion around and inside of the shell 10 to be uniformly mixed and distributed. It will be obvious that such incoming fluids are fed into the substantial space 65 provided above the cylinder head 60. In both forms of the invention described the downward path of the fluids is the annular space 15. In Figure 8 a substantially modified form of apparatus is shown wherein the fluids follow paths of different shapes, and the liquids are heated externally of the apparatus instead of internally by heating units such as the units 20.

Referring to Figure 8, the numeral 68 designates a cylindrical shell having top and bottom heads 69 and 70 respectively. A plate 71 extends as a chord across the interior of the shell 68 terminating as at 72 above the bottom 70. This arrangement forms a weir passage 73 for the downward flow of well fluids including water toward the bottom of the shell 68, and from the passage 73 the fluids flow into and upwardly through the main body of the tank, that is, the chamber 74. The mixture of well fluids and water is fed into the passage 73 through a pipe 75 to the lower end of which is connected one of the mixing and preheating devices 51. This device and its appurtenant connections to the main separator apparatus and to the source of well fluids is identical with that previously described and similar parts have been indicated by the same reference numerals.

The top of the shell 68 may be provided with a suitable gas cleaning device 80 having an outlet 81 which may be similar to the gas outlet 39. Separated oil is withdrawn from the shell 68 through a suitable pipe 82. A stand pipe 83 is connected to the lower portion of the shell 68 and is tapped at 84 for the overflow through the pipe 85 of water from the shell 68.

For the heating of fluids within the shell 68, an external gas-fired or other heating unit 88 may be employed, such unit having a stack 89 to carry off products of combustion and being piped to the interior of the shell 68 as at 90 and 91 for the circulation of fluids from the shell 68 through the heating unit 88.

The operation of the form of the apparatus shown in Figures 1 to 5 inclusive is as follows:

In the normal operation of the apparatus, fluids within the cylinder 14 will be maintained at an elevated temperature by the heating units 20. All well fluids contain more or less water, usually in the form of brine, and this water is allowed to accumulate in the main separating unit up to the level 40, further accumulation of water being prevented by the overflow outlet 46. The heated water thus maintained below the level 40 assists in completing the separation of the well fluid constituents, the free oil floating on the water up to the level 41 and being taken off through the pipe 42. Any gas still remaining in the oil thus separated passes upwardly through the pipe 29, thence around the baffles 36, 37 and 38 for the separation of any liquid which may remain in the gas. The gas is then taken off through the outlet 39. The operation just referred to is identical with that described and claimed in the copending application of Dake and Lyne, Serial No. 531,106, now Patent No. 2,449,738 referred to above.

In the apparatus of the copending application referred to, the well fluids are fed directly into the separating unit so that they flow downwardly through the annular passage 15. Such apparatus and its operation have been found highly effective for the separation of most well fluids, but where such fluids contain a high proportion of gas, rapid foaming takes place as the fluid enters the unit. The present apparatus varies in two distinct respects from the apparatus referred to, the results being to provide an even more efficient separating action and to prevent the disadvantages of foaming with the consequent passing of some of the liquid through the gas outlet.

Referring to Figures 1 and 3, the well fluids flow from the source through pipes 55 and 53 into the mixing and preheating chamber 52. This chamber is connected by the pipe 57 to the interior of the cylinder 14 at a point where the liquid therein is substantially all water, usually brine, as stated. At such point in the cylinder 14, the liquid will be relatively highly heated because of its proximity to the heating units 20. The heated water flows through pipe 57 into the chamber 52 where it performs the first of four separating steps and such first step is highly important. In the first place, the incoming well fluids will be preheated, thus assisting in separating the fluid constituents. In the second place, the well fluids are caused to pass upwardly through the pipe 50 with a great excess of water therein. It is well known that oil emulsions containing a small amount of water are generally "tight" and hard to break or separate, while emulsions containing a large amount of water are generally "loose" and easy to break or separate. The greater the proportion of water in the fluid, the easier will be the separating action and the addition of substantial excess water to the incoming well fluid renders it relatively easily separable, and the ease of separation is enhanced by the heating of the well fluids by the hot water. The addition of heated water to the incoming well fluids also serves to free and expand gas contained in the fluid. Such gas, being very much lighter than the column of fluid within the main separating unit, causes the lifting of the fluid in the pipe 50 to accelerate the flow of liquids and gas through this pipe into the upper end of the main treating apparatus. While the device 51 is similar to an injector, and has some injecting action, the tendency for the device to so function is somewhat reduced by the fact that while the fluids passing upwardly in the pipe 50 are heated, they are at a lower temperature than the fluids within the main separating unit. There is accordingly, a thermo-syphonic unbalance through which there would be a normal tendency for the fluids to flow downwardly through the pipe 50 rather than upwardly. This tendency is completely overcome by the relatively slight injector action provided by the device 51 and by the gravitational unbalance of the fluid column formed by the pipe 50 due to the upward surge of gas therethrough.

The fluids thus flow upwardly through the pipe 50 and through duct 30 to be discharged through the slot 32 (Figure 5) into the bottom of the chamber 31. Much of the gas will have been freed from the fluid, and such gas will flow upwardly through the perforations in the plate 33 and escape directly through the outlet 39 around the gas separator baffles. The substantial area of the open top of the chamber 31 tends to reduce the confinement of the fluids, thus permitting a relatively free escape of gas without foaming. The tendency to foam is further reduced by the perforated plate 33, and primarily the tendency to foam is greatly reduced by the heating of the incoming fluids by an excess of water. The latter feature increases the freedom with which the gas can escape from the well fluid.

Moreover, the chamber 31 acts as a settling chamber in which water is trapped, and this fact also tends to permit a more free escape of gases. The incoming oil will float to the top of the chamber 31 and overflow therefrom together with excess water as it accumulates, and such overflowing liquids pass downwardly through the annular passage 15. The overflowing water being heavier than the oil, will flow more rapidly than the oil, and this fact provides a separating action in the passage 15 which amounts to the effecting of relative movement between the oil and the water to tend to break the emulsions. It will be apparent that the maintenance of the chamber 31 full of water provides for the second separating step, whereas the third step takes place in the downward movement of the fluids through the annular passage 15. As to the latter passage, it will be apparent that it acts as a heat insulator to minimize heat losses from the cylinder 14, while at the same time, liquids in the passage 15 will absorb some of the heat from within the cylinder 14 to be further elevated in temperature as the fluids approach the bottom of the passage 15.

The fluids reaching the bottom of the passage 15 pass around the lower extremity 16 of the cylinder 14 and then flow upwardly into the interior of this cylinder. As stated, most of the liquid in the bottom of the cylinder 14 will be water, and such liquid will be relatively highly heated. As water flows into the bottom of the cylinder 14, some of the water already in this cylinder will be displaced upwardly and will overflow through the outlet 46. The oil passing into the bottom of the cylinder 14 will flow upwardly around and in proximity to the heating units 20 to be relatively highly heated while passing through the body of water adjacent the heating units. The oil will then flow upwardly through and around the baffles 26, which mechanically assist in completing the separating action. The oil of course, will carry water with it in passing through the baffles, and such water will settle on the baffles and flow outwardly and then downwardly around the edges of the baffles. The oil will continue its upward travel through the body of water and thence into the body of oil above the level 40. The upward flow of fluids into the bottom of the cylinder 14 and the downward discharge of water from the baffles adjacent the wall of the cylinder 14 maintain a thermo-syphonic flow of liquid around the heating units 20 at all times. Thus, within the cylinder 14 the fourth and last separating step will take place and complete breaking of the emulsions will have been effected by the time the oil reaches and passes the water level 40.

Each of the forms of the apparatus shown in Figures 6 and 8 employs the mixing and preheating device 51 and its operation is substantially identical with the form of the operation previously described. In the structure shown in Figure 6 the chamber 31 (Figure 2) is eliminated, the head 60 being arranged at the upper end of the cylinder 14. In such case, there is no maintenance of a body of water around the inlet for the well fluids, and the value of such body of water in assisting in the separation of the constituents of the well fluids is lost. However, a substantial gas-separating area is provided to permit the gas to escape freely with minimum foaming, such foaming being very greatly minimized by the treatment of the well fluids in the device 51. The apparatus shown in Figure 6 is highly efficient for most oils, but obviously is not as efficient as the form shown in Figure 2 for oils containing a larger percentage of gas, the elements associated with the chamber 31 being very effective in operation.

The structure shown in Figure 8 may be alternatively employed, and in such form of the invention a shorter separating tank of greater diameter may be employed, the partition 71 serving to define the path of the downwardly moving well fluids. The partition 71 has its lower end terminating above the bottom 70 for the passage into the main chamber of the tank of the well fluids as they move downwardly through the passage 73. The upper end of the partition 71 terminates below the head 69 for the escape of gas into the top of the tank, as will be obvious. Fluids in the main portion of the tank are withdrawn through the pipe 91, heated in the external heating unit 88 and returned to the tank through the pipe 90, the fluid being constantly circulated to be maintained at the proper temperature. The apparatus in Figure 8 will be operable at atmospheric pressure, the stand pipe 83 being open at its upper end. The proper water level will be maintained by the connection of the outlet 84 at the proper point in the pipe 83, excess water being drawn off through the pipe 85.

In each form of the invention, heated liquid, primarily water, is withdrawn from the apparatus and mixed with the incoming well fluids for the purpose of preheating them and providing them with an excess of water. The heat and excess water renders the emulsions much more easily breakable and tends more easily to free the gas for escape from the apparatus without causing excessive foaming. The device 51 in combination with an emulsion treater of any practicable type has been found to render the oil separating action more highly efficient than has been heretofore possible, and the separating action is completed in substantially less time, thus permitting a faster flow of well fluids through a separator of given capacity. The device 51 is especially effective with the types of separating apparatus shown in the drawings, and this is particularly true of the internal construction shown in Figure 2, as will be obvious from the foregoing description.

I claim:

1. Apparatus for treating oil well fluids which comprises a mixing chamber, a duct for supplying well fluids to said chamber, said chamber being of substantially greater cross-sectional area than said duct and having an unobstructed interior for the unrestricted flow of fluids therethrough, a separating casing, means for maintaining a body of water in said casing to a predetermined level, means below said level for heating such water, a duct connecting the interior of said casing to said chamber to supply heated water thereto to be mixed with the well fluids, means for conducting the mixture of well fluids and hot water from said chamber to said separating casing, and separate means for removing separated oil and water from said separating casing.

2. Apparatus for separating oil well fluids comprising a mixing and preheating chamber, a duct for supplying well fluids to said chamber, said chamber being of substantially greater cross-sectional area than said duct and having an unobstructed interior for the unrestricted flow of fluids therethrough, a vertical separating apparatus, means for maintaining a body of water in said separating apparatus to a predetermined level, means below said level for heating such water, a pipe connecting said separating apparatus to said chamber to supply heated water from the former to the latter, a duct connecting said chamber to the upper portion of said separating apparatus, said duct having a portion externally of said separating apparatus forming a fluid column, and separate means for removing separated oil and water from said separating apparatus.

3. Apparatus for separating oil well fluids comprising a vertical casing, means in said casing forming a passage and a separating chamber communicating at their lower ends, means for maintaining a substantial body of water in said separating chamber to a predetermined level, means below said level for heating said water, a mixing and preheating chamber externally of said casing connected to the interior of said separating chamber to receive heated water therefrom, means for supplying well fluids to said mixing and preheating chamber, means for conveying the mixture of well fluids and heated water to said passage for downward flow therethrough, and separate means for removing separated oil and water from said separating chamber.

4. Apparatus constructed in accordance with claim 3 wherein said mixing and preheating chamber is arranged a substantial distance below the upper end of said casing, the means for conveying the mixture of well fluids and the water to said passage comprising a duct having a substantially vertical section whereby the expansion of gas in said mixture will effect an upward flow of fluids through said duct to induce a flow of water from said separating chamber into said mixing and preheating chamber.

5. Apparatus for separating oil well fluids comprising a casing, means in said casing for separating the constituents of oil well fluids, means for maintaining a substantial body of water in said casing to a predetermined level, means below said level for heating such water, a mixing and preheating chamber externally of said casing, a supply pipe for well fluids extending into said chamber and having an open top terminating axially in said chamber and spaced from the top and bottom thereof, a take-off pipe communicating between said chamber and said casing to receive heated water from said casing, means for conveying the mixture of well fluids and heated water from the top of said chamber to said casing, and separate means for removing separated oil and water from said casing.

6. Apparatus for separating oil well fluids comprising a casing, means in said casing for separating the constituents of oil well fluids, means for maintaining a substantial body of water in said casing to a predetermined level, means below said level for heating such water, a mixing and preheating chamber externally of said casing, a supply pipe for well fluids extending into said chamber and having an open top terminating axially in said chamber and spaced from the top and bottom thereof, a take-off pipe communicating between said chamber and said casing to receive heated water from said casing, a duct connecting the top of said chamber to the upper end of said casing to supply the mixture of well fluids and heated water to the latter, said duct having a substantially vertical section whereby the expansion of gases freed from the well fluids by the heated water will effect upward movement of fluids through said duct and induce a flow of water through said take-off pipe into said chamber, and separate means for removing separated oil and water from said casing.

7. The method of treating oil well fluids containing readily gasifiable constituents, which comprises flowing well fluids into a chamber connected with a source of heated water to mix the well fluids with an excess of water and to convert the readily gasifiable constituents, confining the flow of fluids in the chamber to a vertical column whereby the released gases flowing upwardly through such column will induce a flow of the heated water into said chamber, and conducting all of the fluids from the top of said column to a gas, oil and water separator.

8. Apparatus for separating oil well fluids comprising a mixing and preheating chamber having a substantially unobstructed interior for the substantially unrestricted flow of fluids therethrough, means for supplying well fluids to said chamber, a casing, a gas outlet connected to the top of said casing, means for maintaining a substantial body of water and oil in said casing, means below the surface of the water for heating the water and oil, means for supplying heated water from said casing to said chamber, conduit means including a vertical portion extending upwardly from said chamber for supplying well fluids and water to said casing, and separate means for removing separated oil and water from said casing.

9. Apparatus for separating oil well fluids comprising a mixing and preheating chamber of substantial capacity having a relatively unobstructed interior for the substantially free flow of fluids therethrough, means for supplying well fluids to said chamber; a hot water inlet for said chamber; a vertical casing, means in said casing forming a passage, means including a vertical pipe portion communicating at its lower end with said chamber for supplying the mixture of well fluids and water from said chamber to the upper end of said passage, the lower end of said passage communicating with another portion of said casing for the flow of fluids downwardly through said passage, thence upwardly through said other portion of said casing, means for maintaining a substantial body of water and oil in said casing, means below the surface of the water in said casing for heating the water and oil, said hot water inlet communicating with said casing below the level of the water therein for the flow of such water into said chamber; and separate means for removing separated oil and water from said other portion of said casing.

10. Apparatus for separating oil well fluids comprising a bell-like mixing and preheating chamber, means comprising a duct projecting into said chamber for supplying well fluids thereto, said chamber having an unobstructed interior of greater diameter than said duct for the free flow of fluids therethrough, a hot water inlet communicating with said chamber; a casing, a gas outlet connected to the top of said casing, means for maintaining a substantial body of water and oil in said casing, means below the surface of the water for heating the water and oil, said hot water inlet communicating with said casing adjacent said heating means to supply relatively highly heated water from said casing to said chamber, a duct connected between said chamber and the top portion of said casing, said duct having a vertical portion of substantial length communicating at its lower end with said chamber, and separate means for removing separated oil and water from said casing.

JOE A. LYNE.

REFERENCES CITED

The following references are of record in the file of this patent:

UNITED STATES PATENTS

| Number | Name | Date |
| --- | --- | --- |
| 273,778 | Strong | Mar. 13, 1883 |
| 463,062 | Lowden | Nov. 10, 1891 |
| 968,534 | Brown | Aug. 30, 1910 |
| 994,100 | Brown | May 30, 1911 |
| 1,440,832 | Jones | Jan. 2, 1923 |
| 1,521,309 | Miller | Dec. 30, 1924 |
| 1,617,737 | Averill | Feb. 15, 1927 |
| 1,627,072 | Wright | May 3, 1927 |
| 1,770,736 | Funk | July 15, 1930 |
| 2,043,379 | Justus | June 9, 1936 |
| 2,179,131 | Millard | Nov. 7, 1939 |
| 2,181,687 | Walker | Nov. 28, 1939 |
| 2,211,171 | Self | Aug. 13, 1940 |
| 2,245,551 | Adams | June 17, 1941 |
| 2,256,940 | Crawford | Sept. 23, 1941 |
| 2,288,333 | Vinson | June 30, 1942 |
| 2,305,464 | Ashworth | Dec. 15, 1942 |
| 2,319,962 | Walker | May 25, 1943 |
| 2,342,950 | Lovelady | Feb. 29, 1944 |
| 2,421,375 | Elliott | June 3, 1947 |